United States Patent
Nowak et al.

(10) Patent No.: US 12,081,562 B2
(45) Date of Patent: Sep. 3, 2024

(54) PREDICTIVE REMEDIATION ACTION SYSTEM

(71) Applicant: Capital One Services, LLC, McLean, VA (US)

(72) Inventors: Matthew Louis Nowak, Midlothian, VA (US); David Walter Peters, Richmond, VA (US); Keith D. Greene, Mechanicsville, VA (US); Catherine Barnes, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 330 days.

(21) Appl. No.: 17/509,437

(22) Filed: Oct. 25, 2021

(65) Prior Publication Data

US 2023/0126193 A1 Apr. 27, 2023

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/1433* (2013.01); *H04L 63/1483* (2013.01)

(58) Field of Classification Search
None
See application file for complete search history.

(56) References Cited

U.S. PATENT DOCUMENTS

| | | | |
|---|---|---|---|
| 8,751,421 B2 | 6/2014 | Anderson et al. | |
| 10,375,098 B2 | 8/2019 | Oliner et al. | |
| 2004/0153823 A1 | 8/2004 | Ansari | |
| 2014/0180738 A1 | 6/2014 | Phillipps et al. | |
| 2016/0330219 A1 | 11/2016 | Hasan | |
| 2019/0095821 A1 | 3/2019 | Pourmohammad | |
| 2019/0130310 A1 | 5/2019 | Madhava Rao et al. | |
| 2019/0180172 A1 | 6/2019 | Baughman et al. | |
| 2019/0213509 A1 | 7/2019 | Burleson et al. | |
| 2020/0104401 A1* | 4/2020 | Burnett | G06F 16/287 |
| 2020/0293946 A1 | 9/2020 | Sachan et al. | |
| 2020/0322361 A1* | 10/2020 | Ravindra | G06F 16/2477 |

* cited by examiner

*Primary Examiner* — Brandon Hoffman
(74) *Attorney, Agent, or Firm* — Banner & Witcoff, Ltd.

(57) ABSTRACT

Aspects described herein may use machine learning models to predict one or more remediation actions to mitigate occurrence of an incident based upon previous incidents of an entity. Asset ownership data and development operations tools metric data are compiled and a relationship between the compiled data and an occurrence of previous incidents is determined. A machine learning model predicts relationships between the occurrence of a previous incident and assets data. One or more remediation actions are assigned to an asset and a notification is outputted regarding the same.

20 Claims, 5 Drawing Sheets

PREDICTIVE REMEDIATION ACTION SYSTEM

FIELD OF USE

Aspects of the disclosure relate generally to identifying at least one remediation action to mitigate the potential occurrence of an incident of an entity. More specifically, aspects of the disclosure provide techniques for using a machine learning model to predict relationships between data of a previous incident and data of assets that have not had such an incident occur.

BACKGROUND

Operational efficiency often is sought by entities. Many entities want their business to operate with as few incidents that require some form of mitigation to address. For example, cybersecurity is a sector of an entity's business that has increased substantially in recent years. Attacks from hackers and other nefarious individuals are a constant siege for an entity on a daily basis. Coupled with that are power outages, equipment failures, human errors, and other types of incidents that an entity must manage constantly. Yet when new incidents occur for an entity, conventional systems for mitigating the occurrence is slow and hampered by wasted time and resources.

FIG. 1 depicts an example of conventional manner in which a new incident at an entity is addressed. At step 101, a new incident occurs. For example, a fire at a facility that maintains operational backup data servers for an entity may occur. In response to the occurrence of the incident, some likely form of action occurs. In step 103, an incident manager receives notification of the new incident. The incident manager may be someone within the entity that is assigned to address new incidents when they are identified but also may not be someone that directly mitigates the occurrence of the new incident.

In step 105, the incident manager determines whether the new incident is severe enough to review for implementing protocols or other procedures to prevent reoccurrence of the incident. For example, in the case of the operational backup data servers for a facility where a fire occurred, the operational backup servers may be maintaining operational data that is not critical for any day-to-day functions of the entity and/or may simply maintain certain historical data that does not affect operation of the entity immediately. In such a case, the incident manager may determine that the severity level of the new incident does not satisfy a threshold to take more immediate action to mitigate reoccurrence of the incident in the future. Alternatively, the incident manager may determine that the new incident is a severe enough incident that it satisfies a threshold for a management team to review the incident, including the circumstances of the cause of the new incident and the affect taken on the entity. Such may be the case when the new incident concerns operational backup servers for ensuring a website of the entity is operational in case the primary operational servers for operation of the website go offline for any reason.

In step 107, a management team reviews the new incident if the severity level is satisfies a threshold for review purposes. Such a management team may be comprised of individuals of the entity, including potentially other parties, such as a contractor or vendor, that are tasked with reviewing the new incident and the circumstances that led to the new incident. In the case of a fire at a facility of the entity, the management team may include a fire marshal for the facility, a facility manager for the facility, and potentially even a state or local member of the fire department. This management team discussion happens after the effect of the incident has been resolved and is often called a post mortem or post incident review.

Following the discussion by the management team, in step 109, one or more remediation actions may be assigned by the management team. These remediation actions are assigned to help make sure that the issues that caused the new incident to occur do not occur again or are at least less likely to occur again. Example remediation actions may include adding new monitors, removing monitors, altering autoscaling groups, updating resiliency procedures, and updating fire retardant systems. Moving to step 111, the assigned remediation actions may be performed. One or more individuals responsible for the entity resources affected by the new incident perform the remediation actions. Thereafter in step 113, the entity may wait for another new incident to occur to repeat the process as necessary.

Aspects described herein may address these and other problems, and generally enable predicting similarities, in incident data, of incidents that, for a first asset of the entity, were reviewed and had remediation actions assigned to them. The remediation actions may be assigned to one or more second assets of the entity. For example, remediation actions may be assigned to mitigate reoccurrence of an incident after an incident occurred for a certain piece of equipment. The remediation actions may be assigned to a different piece of equipment of the entity, for example, based on similarities between the two pieces of equipment. Such a prediction thereby reduces the likelihood that an occurrence of an incident occurs on the different piece of equipment and reduces the time and resources spent in mitigating the occurrence of such an incident as quickly or efficiently as possible as the system operates proactively as opposed to reactively.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for the prediction and assignment of one or more remediation actions to mitigate the occurrence of an incident of an entity based upon previous incidents of the entity for other equipment and corrective remediation actions taken after the equipment for the previous incident has been restored. This may have the effect of significantly improving the ability of entities to ensure expedited avoidance of occurrence of an incident affecting the entity, ensure individuals likely to be suited for a discussion on mitigating an incident are spending their time reviewing remediation actions assigned by a machine learning model, automatically predict similarities of previous incidents of an asset that have been reviewed with different assets that have not had an incident occur, and improve incident management experiences for future incidents. According to some aspects, these and other benefits may be achieved by taking ownership data representative of assets, involved in one or more incidents, of an entity and data representative of relationships between the assets and metric data representative of development operations tools metric data of the assets, compiling such data, and utilizing it with machine learning models trained to recognize relationships between such data and pieces of equipment of the entity that have not had incidents occur, and to predict the remediation actions to assign to mitigate occurrence of an incident for such a piece of equipment of the entity that has not had an incident occur. Such a prediction then may be used to suggest remediation actions to perform on the different piece of equipment based upon one or more scores.

Aspects discussed herein may provide a computer-implemented method for predicting and assigning one or more remediation actions to mitigate the occurrence of an incident of an entity that has occurred for one piece of equipment and after the issue has been restored. For example, in at least one implementation, a computing device may compile ownership data and metric data as input data to a machine learning model data store. The ownership data may be data representative of assets, involved in one or more incidents, of an entity and data representative of relationships between the assets. The metric data may be data representative of development operations tools metric data of the assets of the entity.

The same computing device or different computing device may determine a relationship between the input data and an occurrence of one or more incidents in new incident data. The new incident data may be data representative of a plurality of incidents involving one or more of the assets of the entity with corresponding one or more assigned remediation actions. Each remediation action may have been assigned to mitigate reoccurrence of a corresponding incident.

A computing device may input data from the machine learning model data store into a machine learning model. The machine learning model may be trained to recognize one or more relationships between the occurrence of one or more incidents and second assets data. The second asset data may comprises data representative of second assets and data representative of relationships between the second assets. The machine learning model further may be trained to predict a relationship between the occurrence and the second assets data, based upon the input data from the machine learning model data store. A computing device may output a notification assigning one or more of the assigned remediation actions to at least one second asset of the entity.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
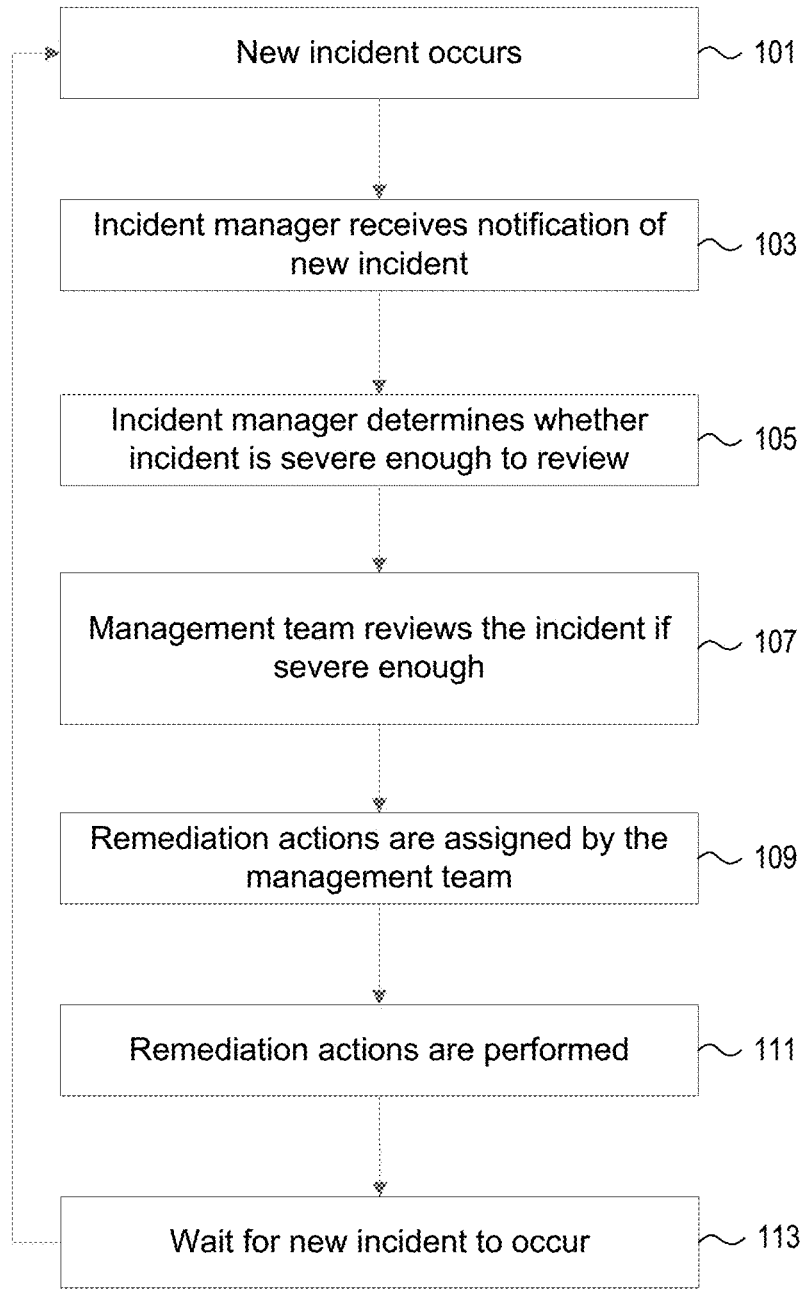
FIG. 1 depicts an example of conventional manner in which a new incident at an entity is addressed.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for identifying and performing at least one remediation action to mitigate the occurrence of an incident of an entity by assigning the at least one remediation action to an asset of the entity that has not had the incident occur to it. The incident may be representative of a previous incident that occurred for the entity. For example, an outage may occur at a facility that maintains servers that are accessible by customers as part of an application on a mobile device. Illustrative example applications include applications for ordering groceries, for checking financial data, for uploading photos as part of a social media application, and/or other uses. Upon implementation, the present disclosure describes receiving ownership data. The ownership data may be data representative of assets, involved in one or more incidents, of an entity and data representative of relationships between the assets. The present disclosure further describes receiving metric data. The metric data may be data representative of development operations tools metric data of the assets.

A first computing device may compile the ownership data and the metric data as input data to a machine learning model data store. As part of the compiling of such data, natural language processing may be utilized in order to account for textual and/or other data entries that do not consistently identify the same or similar data in the same way. The natural language processing may be utilized to identify text in data of various types and in various formats.

The same or a second computing device may receive new incident data. The new incident data may be representative of a plurality of incidents involving one or more of the assets of the entity with one or more assigned remediation actions. Each remediation action may have been assigned to mitigate reoccurrence of a corresponding incident. A determination may be made as to whether a relationship between the input data and an occurrence of one or more incidents in the new incident data is identified. The machine learning model data store may receive refinement data for the machine learning model. The refinement data may be data that updates the input data in the machine learning model data store based upon the new incident data.

The present disclosure further describes recognizing, via a machine learning model, one or more relationships between an occurrence of one or more incidents and second assets data. The second assets data may include data representative of second assets of the entity and data representative of relationships between the second assets. The machine learning model may predict a relationship between the occurrence and the second assets data. Such a prediction may be based upon the input data from the machine learning model data store. Still further, such a predicting the relationship may be based upon the updated input data from the machine learning model data store.

The present disclosure also describes generating, based on the predicted relationship, a score representative of risk of occurrence of an incident involving the at least one second asset. The score may be a numerical value and, in some embodiments, may be compared to a threshold value. The score may be representative of a similarity of an asset that had a previous incident and a second asset of the entity. In some embodiments, the present disclosure further describes generating, based on the predicted relationship, a second score representative of risk of occurrence of a second incident involving the at least one second asset. The system further may compare two or more scores.

Based on one or more scores, a determination may be made to map one or more remediation actions to a second asset to mitigate occurrence of an incident for the second asset of the entity. The mapping may include ranking the assigned remediation actions by the scores. The system may output a notification assigning one or more of the assigned remediation actions to the second asset. The outputting may be based on a first score satisfying a first threshold, a second score satisfying a second threshold, or both. The output operation may be based on a comparison of two or more scores, such as based on the first score being a higher score in comparison to the second score.

In some embodiments, a determination may be made as to whether the assigned remediation actions are confirmed. A user input representative of a confirmation of approving the assigned remediation actions may be received. In a database, a new database entry may be created or an existing entry may be updated. The new or updated data entry may comprise the approved remediation actions and the second asset of the entity. In some embodiments, a determination may be made as to whether a new remediation action is assigned to the second asset of the entity. A user input representative of a confirmation of assigning the new remediation action to the second asset may be received. Thereafter, the assigned remediation actions to mitigate occurrence of an incident on the second asset of the entity may be performed.

Aspects described herein improve the functioning of computers by improving the ability of computing devices to identify and predict remediation actions to assign to an asset to mitigate occurrence of an incident on the asset of an entity that has not yet had the incident occur. Conventional systems are susceptible to failure or repetition of occurrence of a previous incident—for example, an incident that may occur similarly for another entity resource under a similar situation as an incident that had remediation actions assigned to mitigate reoccurrence of that incident may lead to wasted time and resources to address the occurrence of an incident. As such, these conventional techniques leave entities exposed to the possibility of a constant reoccurrence of the incident on the operation of the entity. By providing improved assignment techniques—for example, based on predicting the likely remediation actions to assign to mitigate occurrence of an incident—a proper remediation action assignment can be more accurately determined. Over time, the processes described herein can save processing time, network bandwidth, and other computing resources. Moreover, such improvement cannot be performed by a human being with the level of accuracy obtainable by computer-implemented techniques to ensure accurate prediction of the remediation actions.

Before discussing these concepts in greater detail, however, several examples of a computing device and environment that may be used in implementing and/or otherwise providing various aspects of the disclosure will first be discussed with respect to FIG. 2.

Figure 2:
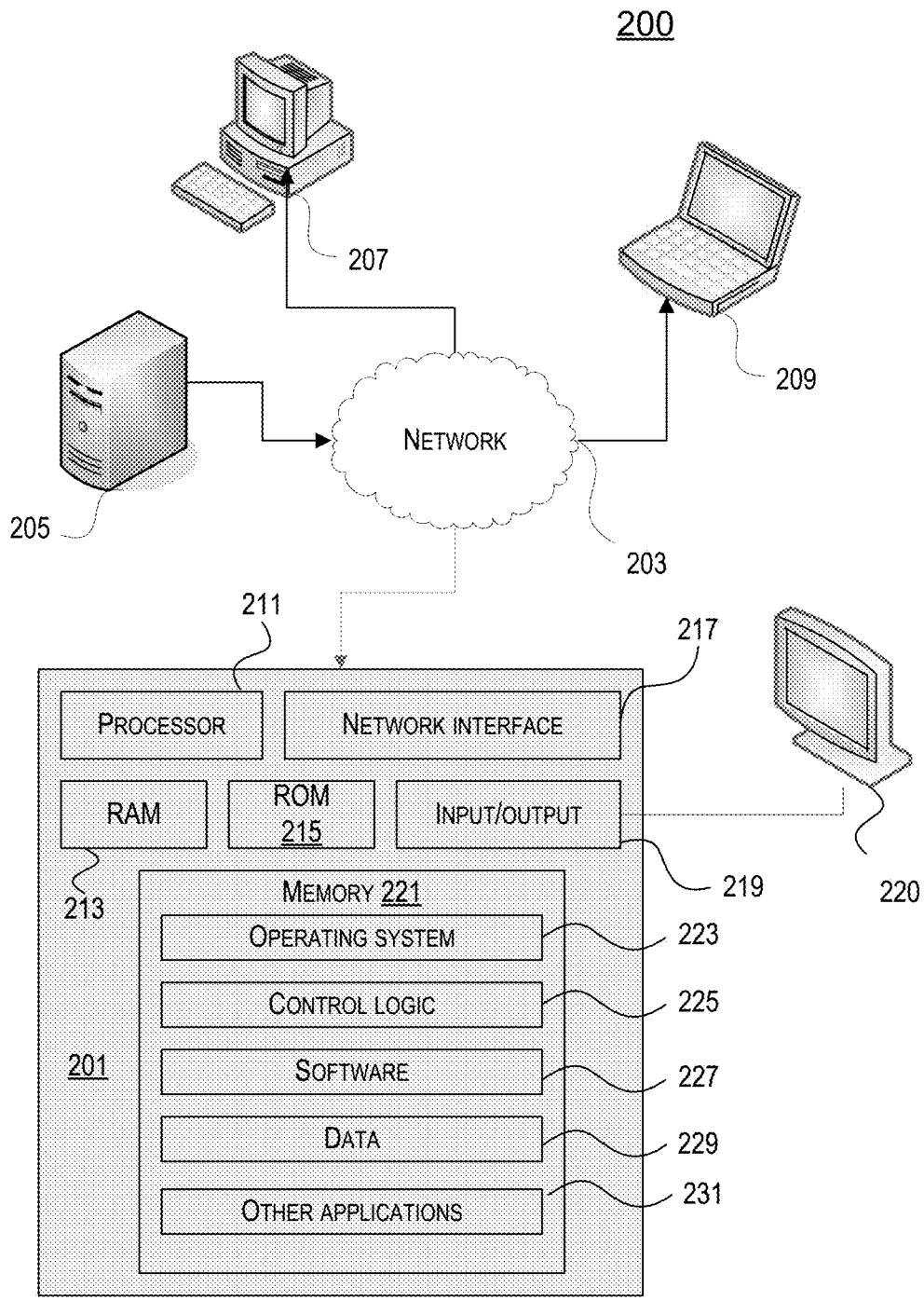
FIG. 2 depicts an example of a computing environment that may be used in implementing one or more aspects of the disclosure in accordance with one or more illustrative aspects discussed herein.

FIG. 2 illustrates one example of a computing environment 200 and computing device 201 that may be used to implement one or more illustrative aspects discussed herein. For example, computing device 201 may, in some embodiments, implement one or more aspects of the disclosure by reading and/or executing instructions and performing one or more actions based on the instructions. In some embodiments, computing device 201 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 201 may, in some embodiments, operate in a standalone environment. In others, computing device 201 may operate in a networked environment, including network 203 and network 381 in FIG. 3. As shown in FIG. 2, various network nodes 201, 205, 207, and 209 may be interconnected via a network 203, such as the Internet. Other networks may also or alternatively be used, including private intranets, corporate networks, local area networks (LANs), wireless networks, personal networks (PAN), and the like. Network 203 is for illustration purposes and may be replaced with fewer or additional computer networks. A LAN may have one or more of any known LAN topologies and may use one or more of a variety of different protocols, such as Ethernet. Devices 201, 205, 207, 209 and other devices (not shown) may be connected to one or more of the networks via twisted pair wires, coaxial cable, fiber optics, radio waves, or other communication media.

As seen in FIG. 2, computing device 201 may include a processor 211, RAM 213, ROM 215, network interface 217, input/output (I/O) interfaces 219 (e.g., keyboard, mouse, display, printer, etc.), and memory 221. Processor 211 may include one or more central processing units (CPUs), graphical processing units (GPUs), and/or other processing units such as a processor adapted to perform computations associated with machine learning. Processor 211 may control an overall operation of the computing device 201 and its associated components, including RAM 213, ROM 215, network interface 217, I/O interfaces 219, and/or memory 221. Processor 211 can include a single central processing unit (CPU) (and/or graphic processing unit (GPU)), which can include a single-core or multi-core processor along with multiple processors. Processor(s) 211 and associated components can allow the computing device 201 to execute a series of computer-readable instructions to perform some or all of the processes described herein. A data bus can interconnect processor(s) 211, RAM 213, ROM 215, memory 221, I/O interfaces 219, and/or network interface 217.

I/O interfaces 219 may include a variety of interface units and drives for reading, writing, displaying, and/or printing data or files. I/O interfaces 219 may be coupled with a display such as display 220. I/O interfaces 219 can include a microphone, keypad, touch screen, and/or stylus through which a user of the computing device 201 can provide input, and can also include one or more of a speaker for providing audio output and a video display device for providing textual, audiovisual, and/or graphical output.

Network interface 217 can include one or more transceivers, digital signal processors, and/or additional circuitry and software for communicating via any network, wired or wireless, using any protocol as described herein. It will be appreciated that the network connections shown are illustrative and any means of establishing a communications link between the computers or other devices can be used. The existence of any of various network protocols such as TCP/IP, Ethernet, FTP, Hypertext Transfer Protocol (HTTP) and the like, and various wireless communication technologies such as Global system for Mobile Communication (GSM), Code-division multiple access (CDMA), WiFi, and Long-Term Evolution (LTE), is presumed, and the various computing devices described herein can be configured to communicate using any of these network protocols or technologies.

Memory 221 may store software for configuring computing device 201 into a special purpose computing device in order to perform one or more of the various functions discussed herein. Memory 221 may store operating system software 223 for controlling overall operation of computing device 201, control logic 225 for instructing computing device 201 to perform aspects discussed herein, software 227, data 229, and other applications 231. Control logic 225 may be incorporated in and may be a part of software 227. In other embodiments, computing device 201 may include two or more of any and/or all of these components (e.g., two or more processors, two or more memories, etc.) and/or other components and/or subsystems not illustrated here.

Devices 205, 207, 209 may have similar or different architecture as described with respect to computing device 201. Those of skill in the art will appreciate that the functionality of computing device 201 (or device 205, 207, 209) as described herein may be spread across multiple data processing devices, for example, to distribute processing load across multiple computers, to segregate transactions based on geographic location, user access level, quality of service (QoS), etc. For example, devices 201, 205, 207, 209, and others may operate in concert to provide parallel computing features in support of the operation of control logic 225 and/or software 227.

Although not shown in FIG. 2, various elements within memory 221 or other components in computing device 201, can include one or more caches including, but not limited to, CPU caches used by the processor 211, page caches used by an operating system, disk caches of a hard drive, and/or database caches used to cache content from a data store. For embodiments including a CPU cache, the CPU cache can be used by one or more processors 211 to reduce memory latency and access time. Processor 211 can retrieve data from or write data to the CPU cache rather than reading/writing to memory 221, which can improve the speed of these operations. In some examples, a database cache can be created in which certain data from a data store is cached in a separate smaller database in a memory separate from the data store, such as in RAM 215 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of devices, systems, and methods described herein, such as faster response times and less dependence on network conditions when transmitting and receiving data.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although various components of computing device 201 are described separately, functionality of the various components can be combined and/or performed by a single component and/or multiple computing devices in communication without departing from the invention. Having discussed several examples of computing devices that may be used to implement some aspects as discussed further below, discussion will now turn to various examples for assigning one or more remediation actions to mitigate the reoccurrence of an incident of an entity.

Figure 3:
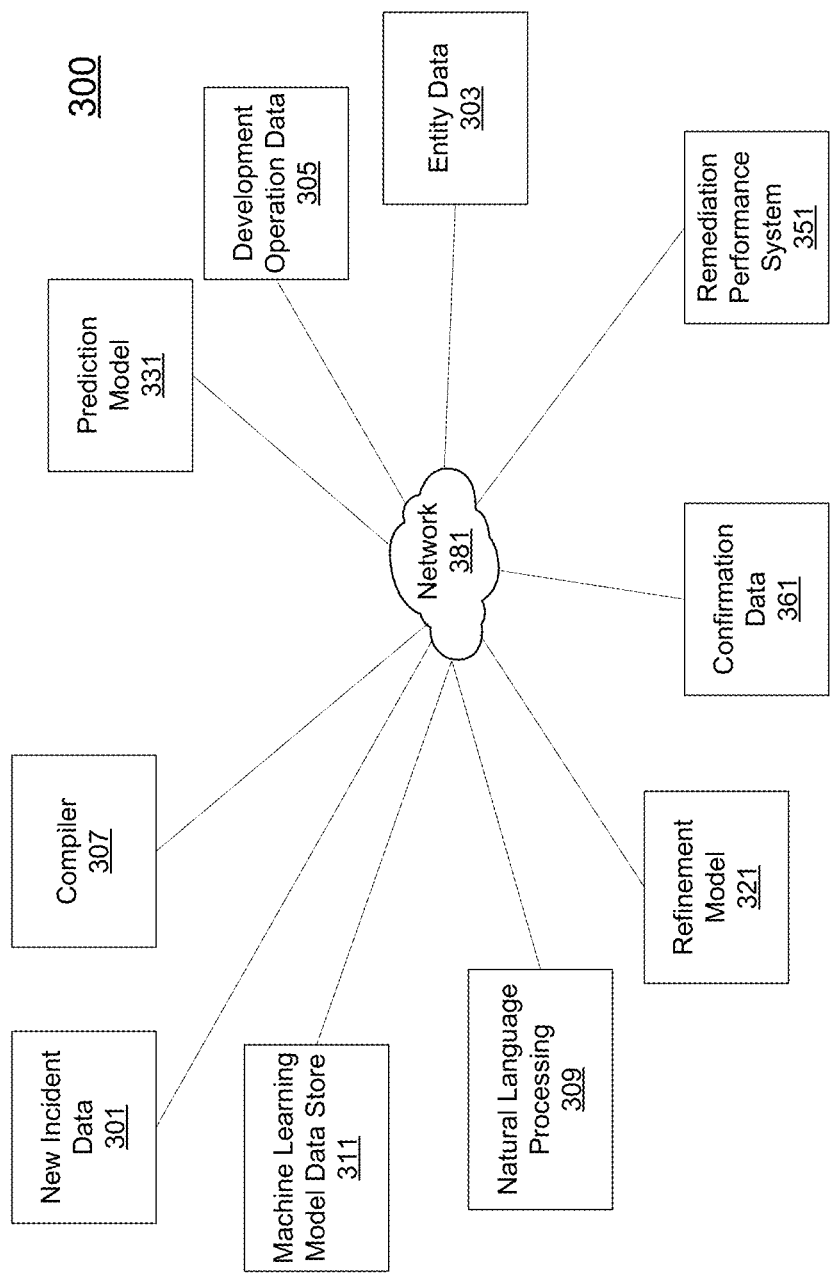
FIG. 3 illustrates a system for assigning one or more remediation actions to mitigate the occurrence of an incident of an entity in accordance with one or more aspects described herein.

FIG. 3 illustrates a system 300 for assigning one or more remediation actions to mitigate the occurrence of an incident of an entity. The operating environment 300 may include computing devices 307, 309, 321, and 331, memories or databases 301, 303, 305, 311, and 361, and a remediation performance system 351 in communication via a network 381. Network 381 may be network 203 in FIG. 2. It will be appreciated that the network 381 connections shown are illustrative and any means of establishing a communications link between the computing devices, remediation performance system, and memories or databases may be used. The existence of any of various network protocols such as Transmission Control Protocol/Internet Protocol (TCP/IP), Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices and/or network described with respect to FIG. 2.

As shown in FIG. 3, the system 300 may include one or more memories or databases that maintains new incident data 301. A computing device utilizing natural language processing 309 may be configured to access the one or more memories or databases that maintains new incident data 301. The new incident data 301 may include data representative of one or more past incidents of the entity that affect one or more specific pieces of equipment, including hardware, software, firmware, or some combination thereof. The new incident data 301 may be historical data of previous incidents, including causes of an incident, start time of an incident, end time of an incident, time periods of an incident, assets of the entity effected by an incident, locations where an incident occurred, a severity of an incident in effecting some operation or function of the entity, and/or data regarding successful steps taken and failures in mitigating an incident. The new incident data 301 also may include one or more remediation actions that was assigned to mitigate reoccurrence of a corresponding past incident. The remediation action data also may include new protocols and/or procedures implemented in response to the corresponding incident and/or new equipment used in conjunction with or as a back up to, assets involved in the previous incident. Any specific action that may have been used to mitigate the reoccurrence of a previous incident is an example remediation action. New incident data 301 further may be used by refinement model 321 as specific data indicating that a positive outcome for an incident associated with an asset of an entity has been identified.

The system 300 may include one or more memories or databases that maintains entity data 303. A computing device utilizing natural language processing 309 may be configured to access the one or more memories or databases that maintains entity data 303. The entity data 303 may include data representative of assets of an entity. Assets of an entity may include computing devices, databases, servers, facilities, software, firmware, and/or other equipment of the entity. The assets of the entity may have been involved in one or more specific incidents in which mitigation of the incident was needed in addition to assets of the entity that have not been involved in one or more specific incidents in which mitigation of the incident was needed. The entity data 303 also may include data representative of associations between the assets of the entity. In some embodiments, entity data 303 may include data representative of support team ownership data and/or line of business ownership data, e.g., data for one or more members of a support team and/or line of business of the entity that is responsible for operation, implementation, and/or development of one or more pieces of equipment of the entity, including software and/or firmware operating on a physical piece of equipment and/or software and/or firmware implementing specific code of the entity, such as an application.

The system 300 may include one or more memories or databases that maintains development operations data 305. A computing device utilizing natural language processing 309 may be configured to access the one or more memories or databases that maintains development operations data 305. The development operations data 305 may include data representative of development operations tools metric data. Development operations tools metric data may include metrics that are measurable to a value for an entity. Value designations may be based upon a scale in order to provide tangible measured data for the applicable metric. Development operations tools metric data may include metrics that measure that which is important for an entity. Development operations tools metric data may include metrics in which individuals, such as team members, cannot change or otherwise affect measurement results. Development operations tools metric data may include analysis of the metrics over time that provides insights on possible improvements of some system, workflow, policy, etc. of an entity. Development operations tools metric data may include metrics that directly identifies a root cause of an incident as opposed to an indication that something is wrong.

Development operations tools metric data further may include metric data such as development lead time, idle time, and cycle time. Development operations tools metric data further may include mean time to failure data, e.g., a period of time from product/feature launch to the first failure, which is characterized by uninterrupted availability of service and correct system behavior until a failure occurs. Development operations tools metric data further may include mean time to detection data, e.g., a period of time from the incident occurring to a individual being informed of the incident and diagnosing its root cause. This metric identifies the efficiency of incident tracking and monitoring systems. Development operations tools metric data further may include mean time to recovery, e.g., a period of time between finding a root cause and correcting the incident. Such metric includes code complexity, development operations workflow maturity, operational flexibility, and a variety of other parameters. Development operations tools metric data further may include mean time between failures, e.g., the period of time between a next failure of the same type occurring. Such a metric highlights an entity's system stability and process reliability over time. Examples of development operations tools metric data include periodic scan data for a development operations tool, such as Eratocode, and product change information including metric values as of time of product changes.

System 300 may include one or more computing devices as a compiler 307 for compiling the entity data 303 and the development operations tools metric data 305. Compiler 307 compiles the entity data 303 and the development operations tools metric data 305 for use as input data to a machine learning model data store 311. Compiler 307 may utilize natural language processing 309 in order to modify data for storage in the machine learning model data store 311. Compiler 307 may be configured to load various data from the entity data 303 and development operations tools metric data 305 and in order to create one or more derived fields for use in the machine learning model data store 311. Derived fields may include data entries that do not exist in the machine learning model data store 311 itself. Rather, they are calculated from one or more existing numeric fields via basic arithmetic expressions and non-aggregate numeric functions.

System 300 may include one or more computing devices utilizing natural language processing 309. The one or more computing devices utilizing natural language processing 309 may receive data and/or access data from one or more of memories or databases 301, 303, 305, 311, and 361. Natural language processing 309 may be utilized in order to account for textual and/or other data entries that do not consistently identify the same or similar data in the same way. The natural language processing 309 may be utilized to identify text in data of various types and in various formats.

The system 300 may include one or more memories or databases as a machine learning model data store 311 that maintains data as input to a refinement model 321 and/or a prediction model 331. Machine learning model data store 311 maybe configured to maintain data elements used in refinement model 321 and prediction model 331 that may not be stored elsewhere, or for which runtime calculation is either too cumbersome or otherwise not feasible. Examples include point-in-time historical values of development operations attribute values, development operations attribute values as of time of production change, and historical production asset ownership information. Any derived fields related to rates of change of these attributes, historical trend information that might be predictive, as well as model specifications may be maintained here as well.

System 300 may include one or more computing devices implementing a refinement model 321. Refinement model 321 may be a machine learning model. Refinement model 321 may be trained to recognize a relationship between input data in machine learning model data store 311 and an occurrence of one or more incidents in new incident data 301. Specifically, refinement model 321 may be configured to use the new incident date 301 to discern an objective relationship between the occurrence of incidents and the data captures for production assets in the machine learning model data store 311. The output of refinement model 321 may include refined model data that is then maintained in the machine learning model data store 311. The refined model data thereafter may be used as input to prediction model 331.

System 300 may include one or more computing devices implementing a prediction model 331. Prediction model 331 may be a machine learning model. Prediction model 331 may be trained to recognize one or more relationships between the occurrence of one or more incidents and other asset data of the entity maintained in entity data 303. This other asset data may include data representative of assets of the entity, and data representative of relationships between the assets, for assets that have not been subject to occurrence of a specific incident. Prediction model 331 may be configured to use the entity data 301 to determine targets to which the prediction model 331 is applied. In addition, prediction model 331 utilizes the body of attributes maintained in the machine learning model data store 311. Prediction model 331 may predict a relationship between the occurrence of a new incident and the other assets data in entity 303 based upon the input data from the machine learning model data store 311. Once implemented, prediction model 331 may output to machine learning model data store 311. In addition, prediction model 331 may output a notification assigning one or more remediation actions, associated with the new incident, to one or more of the other asset data retrieved from entity data 303. The output may be an assessment of the risk of incurring an incident at one or more other assets. Illustrative notifications include an alert of some type, an email, an instant message, a phone call, and/or some other type of notification.

Prediction model 331 may be trained to output a score representative of risk of occurrence of a specific incident involving one or more other assets of the entity that have not been subjected to the specific incident. Such a score may be generated based on the predicted relationship. A score may be a numerical value associated with a designated scale with a higher value corresponding to higher risk of occurrence determination. In some embodiments, each score may be compared to a threshold value. The threshold value may be a score requirement for taking some additional action to map remediation actions associated with the previous incident. When a score satisfies the threshold value, the remediation action may be mapped to the identified other asset of the entity that has not been subjected to the specific incident. In some embodiments, a score may not be outputted unless the score satisfies a threshold. In some embodiments, additional scores representative of risk of occurrence of other specific incidents involving one or more other assets of the entity that have not been subjected to the other specific incidents may be outputted. Such additional scores may be generated based on the predicted relationships. These additional scores may be representative of risk of occurrence of additional incidents involving the identified other asset. In embodiments in which there are multiple scores, the prediction model 331 may output based on one or more of the plurality of scores. In embodiments of multiple scores, different incidents may have different thresholds to satisfy. In some embodiments, the predictive model 331 may compare a plurality of scores with each other and output based on the comparison, such as one score being higher in value than a second score.

Prediction model 331 may include one or more computing devices as a mapper for mapping, based on scores, one or more remediation actions to the identified other asset of the entity that has not been subjected to the specific incident. Such a mapper may be configured to use one or more scores to map one or more remediation actions. The mapping may be based on the highest score. Such a mapping may include ranking the remediation actions by the scores.

System 300 includes a remediation performance system 351 configured to perform any assigned remediation actions to mitigate the occurrence of a specific incident involving one or more other assets of the entity that have not been subjected to the specific incident. The assigned remediation actions may be the remediation actions mapped based upon scores by prediction model 331. As part of remediation performance system 351, in some embodiments, the assigned remediation actions may be based on determining whether the remediation actions are confirmed assigned by an individual. An individual may accept or reject remediation actions and the remediation performance system 351 may perform the assigned remediation actions that are remediation actions that were accepted by an individual.

System 300 also includes confirmation data 361. Confirmation data 361 may include receiving user input that is representative of a confirmation of assigning one or more remediation actions. System 300 may be configured to be completely autonomous where remediation actions are automatically assigned. Alternatively, system 300 may be configured to require a confirmation by a user prior to assigning one or more of the remediation actions to the incident. The user may confirm all, some, or none of the remediation actions that the system has identified. In some occurrences, the user may identify additional and/or different remediation actions to assign. This user confirmation and/or user override of remediation action assignment may be feedback data to the machine learning model data store 311 and/or new incident data 301. Data maintained in the new incident data 301 and utilized by the machine learning model 331 described herein may be updated to account for the confirmation data 361. Such an update may include creating, in the database maintaining new incident data, a new database entry comprising the assigned remediation actions and the one or more other assets of the entity that have not been subjected to the specific incident.

Figure 4A:
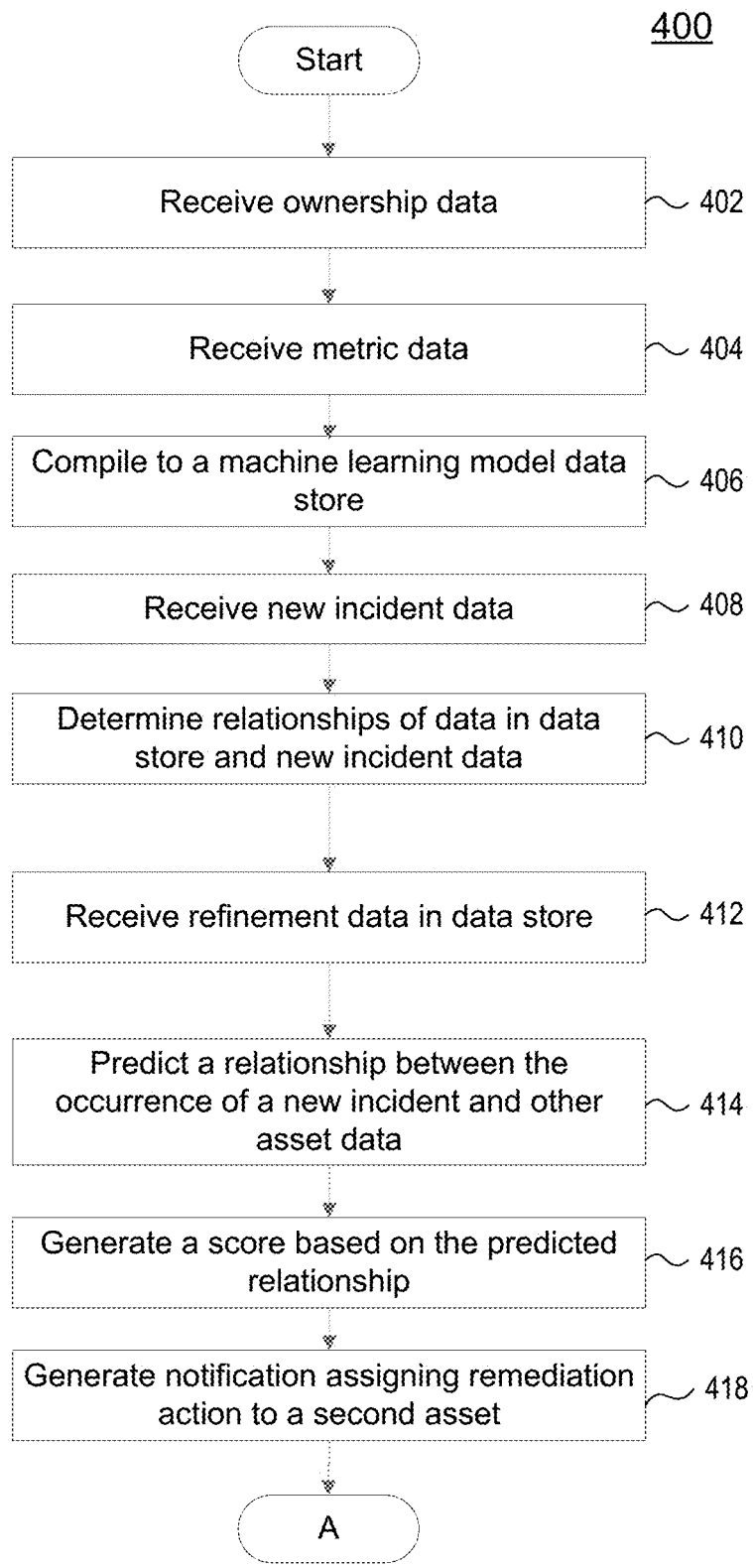
FIGS. 4A-4B depict a flowchart for a method for assigning one or more remediation actions to mitigate the occurrence of an incident of an entity in accordance with one or more aspects described herein.
Figure 4B:
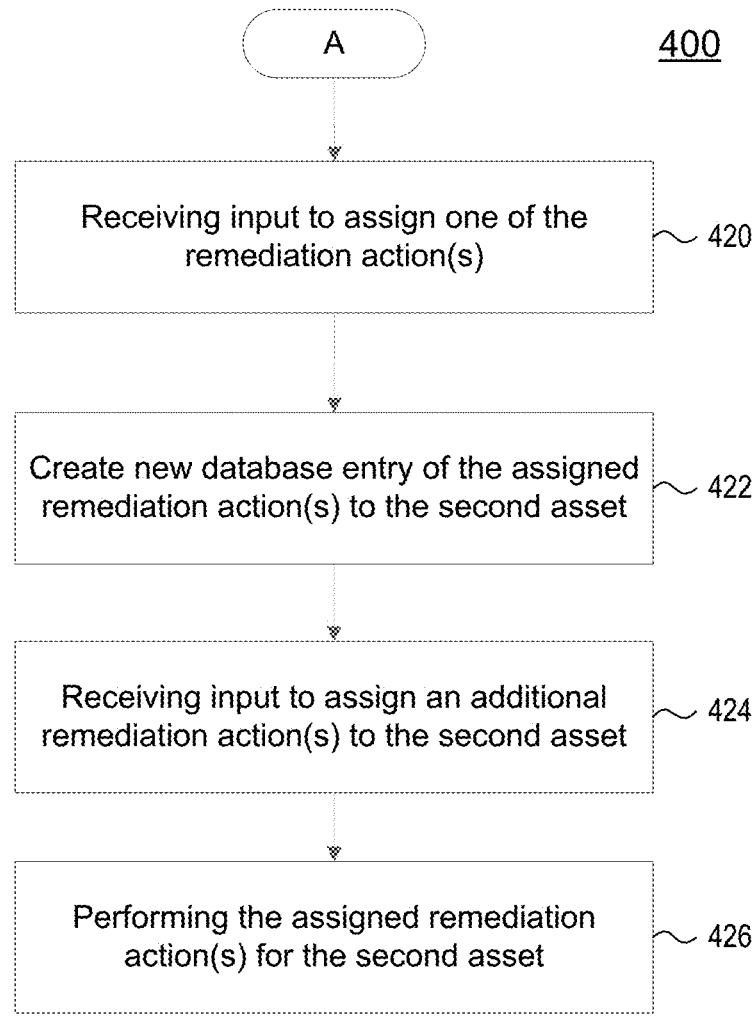

FIGS. 4A-4B depict a flowchart for a method for assigning one or more remediation actions to mitigate the occurrence of an incident of an entity. Some or all of the steps of method 400 may be performed using a system that comprises one or more computing devices as described herein, including, for example, computing device 201, or computing devices in FIG. 2, and computing devices in FIG. 3.

At step 402, one or more computing devices may receive ownership data. Ownership data may be maintained in a memory of a computing device and/or as part of a database or other memory location accessible by a computing device, such as entity data 303 in FIG. 3. The ownership data may include data representative of assets of an entity. Some assets of the entity may have been involved in one or more incidents in which mitigation of an incident was needed while others may not have been. Illustrative examples of an incident include the destruction of entity equipment, a cybersecurity attack on equipment of an entity, a power outage effecting equipment of an entity, and data corruption associated with equipment of an entity. The ownership data also may include data representative of associations between the assets of the entity. For example, two assets (e.g., pieces of equipment) may both be maintained within a certain building of the entity. Thus, a fire at the certain building may affect both assets. Two or more assets also may be associated with each other as they provide data to and/or receive data from the other asset. For example, an application on a mobile device may access a user authentication server to ensure a user has access rights to certain data and the application may separately access a database that maintains content desired by the user. Accordingly, there may be an association established between the application and the authentication server and between the application and the database and/or between the application, the authentication server, and the database.

At step 404, one or more computing devices may receive development operations data. Development operations data may be maintained in a memory of a computing device and/or as part of a database or other memory location accessible by a computing device, such as development operations data 305 in FIG. 3. The development operations data may include data representative of development operations tools metric data.

At step 406, one or more computing devices may compile the ownership data and development operations tools metric data for use as input data to one or more machine learning model data stores. Compiling of data may be implemented by compiler 307 as described for FIG. 3. As part of the process of compiling the various data, natural language processing may be utilized in order to account for textual and other data entries that do not consistently identify the same or similar data in the same way. The natural language processing may be utilized to identify text in data of various types and in various formats. The identified text may be grouped with similarly identified text into various fields for eventual use in a machine learning model data store. The compiled data may be maintained in a memory as needed for use in one or more machine learning models. The various fields of data may include time series data, incident cause data, device impact data, scoring data, remediation action data, and user confirmation data as described herein.

At step 408, one or more computing devices may receive new incident data. New incident data may be maintained in a memory of a computing device and/or as part of a database or other memory location accessible by a computing device, such as new incident data 301 in FIG. 3. The new incident data may include data representative of one or more past incidents of the entity that affect one or more specific pieces of equipment, including hardware, software, firmware, or some combination thereof. As such, an entity may maintain previous data of previous incidents, including causes, times, assets effected, locations, severity of the incident in effecting some operation or function of the entity, and/or successes and failures in mitigating the incidents. The new incident data may include one or more remediation actions that were assigned to mitigate reoccurrence of a corresponding past incident. In the example of a previous incident in which a fire at a facility occurred, incident data, a remediation action may have been to place equipment in a fire retardant location and/or to implement a fire extinguishing system in a room housing such equipment. The remediation action data also may include new protocols and procedures implemented in response to the corresponding incident and/or new equipment used in conjunction with or as a back up to, assets involved in the previous incident. Any specific action that may have been used to mitigate the reoccurrence of a previous incident is an example remediation action.

Moving to step 410, input data may be inputted to a refinement model to determine a relationship between the input data and an occurrence of one or more incidents in the new incident data. As described herein, the new incident data may be representative of a plurality of incidents involving one or more of assets with corresponding one or more assigned remediation actions, and each remediation action was assigned to an incident to mitigate reoccurrence of the corresponding incident. Such a refinement model may be refinement model 321 described in FIG. 3. The input data may be obtained from a machine learning model data store, such as machine learning model data store 311 and the new incident data may be obtained from new incident data 301 as described in FIG. 3. The output of the refinement model may include refinement data. In step 412, refinement data may be received by a machine learning model data store. The refinement data may be used to update the input data in the machine learning model data store based upon the new incident data.

Moving to step 414, a computing device may receive second assets data. Second assets data may include data representative of second assets and data representative of relationships between the second assets. This second asset data may include data representative of assets of the entity, and data representative of relationships between the assets, for assets that have not been subject to occurrence of a specific incident. With this second assets data, input data from machine learning model data store, that may include refinement data, may be inputted to a machine learning model trained to recognize one or more relationships between the occurrence of one or more incidents and the second assets data. The machine learning model may operate on one or more computing devices, such as the one or more computing devices in FIGS. 2 and 3. The machine learning model may be a prediction model, such as prediction model 331 described in FIG. 3. This machine learning model may be configured to use the second assets data to determine targets to which the prediction model is applied. Second assets data may comprises data from entity data 303.

Proceeding to step 416, the machine learning model may output a score representative of risk of occurrence of a specific incident involving one or more second assets of the entity that have not been subjected to the specific incident. Step 416 may be implemented for each second assets within the entity data. A score may be a numerical value associated with a designated scale with a higher value corresponding to higher risk of occurrence determination. The one or more computing devices implementing step 416 may be one or more of the same computing devices described in FIGS. 2 and 3. In some embodiments, each score may be compared to a threshold value. In embodiments in which there are multiple scores, the machine learning model may output based on one or more of the plurality of scores. In embodiments of multiple scores, different incidents may have different thresholds to satisfy. In some embodiments, the machine learning model may compare a plurality of scores with each other and output based on the comparison, such as one score being higher in value than a second score.

As part of step 416, one or more computing device may map one or more remediation actions based upon the one or more scores found to satisfy a threshold value. The one or more computing devices may be the one or more computing devices in FIGS. 2 and 3. Step 416 may include ranking the remediation actions by the scores. In some embodiments, this will be a list of potentially ranked remediation actions that should be evaluated for use in mitigating occurrence of a specific incident involving at least one second asset.

In step 418, the machine learning model may output a notification assigning one or more remediation actions, associated with the new incident, to one or more of the second assets data, such as data retrieved from entity data 303 in FIG. 3. The output may be an assessment of the risk of incurring an incident at the one or more second assets. Illustrative notifications include an alert of some type, an email, an instant message, a phone call, and/or some other type of notification. Accordingly, an individual may receive an email message indicating that a specific second asset not previously involved in a specific incident have one or more remediation actions assigned to it for the individual to implement and/or determine whether the one or more remediation actions are to be implemented to mitigate occurrence of the specific incident at the second asset. Step 418 further may include the machine learning model, such as prediction model 331 described in FIG. 3, to output the identified remediation actions to a machine learning model data store, such as machine learning model data store 311 described in FIG. 3. Thereafter, the remediation actions that the system identified for the second asset may be associated with the predictive steps taken for the specific incident that has not occurred for the second asset.

Moving to FIG. 4B, in step 420, a user input representative of a confirmation of assigning the remediation action(s) to the second asset being evaluated may be received. Step 420 may include a determination as to whether the remediation action(s) are assigned to such a second asset. An individual may accept or reject any particular remediation action before proceeding to step 422. In alternative embodiments, no user confirmation to assign the one or more remediation actions to the second asset being evaluated may be received. This may be a situation in which the system operates autonomously and merely assigns any remediation actions automatically without user confirmation before proceeding to step 422. Step 420 may be implemented by receiving such confirmation data from confirmation data 361 as described in FIG. 3.

In step 422, a new database entry in the new incident data and/or the machine learning model data store may be created. The new database entry may include the automatically assigned or the confirmed remediation action(s) and the second asset being evaluated. Accordingly, the new incident data and/or machine learning model data store now has been updated to account for any assigned remediation actions being provided for the second asset being evaluated. Again, this process may occur separately or concurrently for each second asset.

Proceeding to step 424, one or more computing device may receive input to assign one or more additional remediation actions to the second asset being evaluated. An individual may identify additional remediation actions to assign to the second asset being evaluated. For example, after reviewing the provided list of remediation actions mapped and potentially ranked, an individual, who may be responsible for the second asset and/or system affected by the second asset being evaluated, may determine that an additional remediation action, not included among those that were included in the provided list, should be assigned to the second asset being evaluated.

In step 426, the assigned remediation actions that were mapped, accepted, and or added, are performed with respect to the second asset being evaluated. Once again, this step may be performed with respect to each remediation action for each second asset. In a future instance, the machine learning matching model may learn how a previous identification of remediation actions to map to a second asset was changed and/or confirmed by a user and may apply the same when a similar second asset for evaluation occurs in the future.

One or more steps of the example may be rearranged, omitted, and/or otherwise modified, and/or other steps may be added.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
compiling, by a first computing device, ownership data and metric data as input data to a machine learning model data store, wherein the ownership data comprises data representative of assets, involved in one or more incidents, of an entity and data representative of relationships between the assets, wherein the metric data comprises data representative of development operations tools metric data of the assets;
determining, by a second computing device, a relationship between the input data and an occurrence of one or more incidents in new incident data, representative of a plurality of incidents involving one or more of the assets with corresponding one or more assigned remediation actions, wherein each remediation action was assigned to mitigate reoccurrence of a corresponding incident;
predicting, via a machine learning model trained to recognize one or more relationships between the occurrence of one or more incidents and second assets data, wherein the second assets data comprises data representative of second assets and data representative of relationships between the second assets, a relationship between the occurrence and the second assets data, based upon the input data from the machine learning model data store; and
outputting a notification assigning one or more of the assigned remediation actions to at least one second asset.

2. The method of claim 1, further comprising:
generating, based on the predicted relationship, a score representative of risk of occurrence of an incident involving the at least one second asset,
wherein the outputting is based on the score satisfying a threshold.

3. The method of claim 2, further comprising:
generating, based on the predicted relationship, a second score representative of risk of occurrence of a second incident involving the at least one second asset,
wherein the outputting is based on the second score satisfying a second threshold.

4. The method of claim 1, further comprising receiving, by the first computing device, the ownership data.

5. The method of claim 1, further comprising sending, to a third computing device, the second assets data.

6. The method of claim 1, further comprising receiving, by the first computing device, the metric data.

7. The method of claim 1, further comprising receiving refinement data to the machine learning model, wherein the refinement data updates the input data to the machine learning model data store based upon the new incident data.

8. The method of claim 7, wherein the predicting the relationship is based upon the updated input data from the machine learning model data store.

9. The method of claim 1, further comprising receiving, by the second computing device, the new incident data.

10. The method of claim 1, wherein the first and second computing devices are the same computing device.

11. The method of claim 1, further comprising:
generating, based on the predicted relationship, a first score representative of a risk of occurrence of a first incident involving the at least one second asset; and
generating, based on the predicted relationship, a second score representative of a risk of occurrence of a second incident involving the at least one second asset,
wherein the outputting is based on at least one of the first score or the second score.

12. The method of claim 11, further comprising comparing the first score with the second score, wherein the outputting is based on the comparison.

13. The method of claim 12, wherein the outputting is based on the first score being a higher score in comparison to the second score.

14. A computing device comprising:
one or more processors; and
memory storing instructions that, when executed by the one or more processors, cause the computing device to:
receive ownership data representative of assets, involved in one or more incidents, of an entity and data representative of relationships between the assets;
receive metric data representative of development operations tools metric data of the assets;
compile the received ownership data and the received metric data as input data to a machine learning model data store;
receive new incident data representative of a plurality of incidents involving one or more of the assets with corresponding one or more assigned remediation actions, wherein each remediation action was assigned to mitigate reoccurrence of a corresponding incident;
determine a relationship between the input data and an occurrence of one or more incidents in the new incident data;
receive second assets data representative of one or more second assets and data representative of relationships between the second assets;
predict the relationship between the occurrence of one or more incidents and the second assets data based upon the input data from the machine learning model data store; and
output a notification assigning one or more of the assigned remediation actions to at least one second asset.

15. The computing device of claim 14, wherein the instructions, when executed by the one or more processors, cause the computing device to generate, based on the predicted relationship, a score representative of risk of occurrence of an incident involving the at least one second asset, wherein the notification is outputted based on the score.

16. The computing device of claim 14, wherein the instructions, when executed by the one or more processors, cause the computing device to generate, based on the predicted relationship, a first score representative of a risk of an occurrence of a first incident involving the at least one second asset.

17. The computing device of claim 16, wherein the instructions, when executed by the one or more processors, cause the computing device to generate, based on the predicted relationship, a second score representative of a risk of an occurrence of a second incident involving the at least one second asset.

18. The computing device of claim 14, wherein the instructions, when executed by the one or more processors, cause the computing device to receive refinement data to the machine learning model, wherein the refinement data updates the input data to the machine learning model data store based upon the new incident data.

19. One or more non-transitory media storing instructions that, when executed by one or more processors, cause the one or more processors to perform steps comprising:
receive ownership data representative of assets, involved in one or more incidents, of an entity and data representative of relationships between the assets;
receive metric data representative of development operations tools metric data of the assets;
compile the received ownership data and the received metric data as input data to a machine learning model data store;
receive new incident data representative of a plurality of incidents involving one or more of the assets with corresponding one or more assigned remediation actions, wherein each remediation action was assigned to mitigate reoccurrence of a corresponding incident;
determine a relationship between the input data and an occurrence of one or more incidents in the new incident data;
receive second assets data representative of one or more second assets and data representative of relationships between the second assets;
predict the relationship between the occurrence of one or more incidents and the second assets data based upon the input data from the machine learning model data store; and
output a notification assigning one or more of the assigned remediation actions to at least one second asset.

20. The one or more non-transitory media storing instructions of claim 19 that, when executed by the one or more processors, cause the one or more processors to perform a further step comprising generate, based on the predicted relationship, a score representative of risk of occurrence of an incident involving the at least one second asset, wherein the output the notification is based on the score.

* * * * *